US012662316B2

(12) United States Patent
Li et al.

(10) Patent No.: US 12,662,316 B2
(45) Date of Patent: Jun. 23, 2026

(54) GOODS PICKING APPARATUS, DEPTH MEASUREMENT METHOD, WAREHOUSING ROBOT, AND WAREHOUSING SYSTEM

(71) Applicant: HAI ROBOTICS CO., LTD., Shenzhen (CN)

(72) Inventors: Huixiang Li, Shenzhen (CN); Ying Zhao, Shenzhen (CN)

(73) Assignee: HAI Robotics Co., Ltd., Shenzhen (CN)

( * ) Notice: Subject to any disclaimer, the term of this patent is extended or adjusted under 35 U.S.C. 154(b) by 690 days.

(21) Appl. No.: 18/151,547

(22) Filed: Jan. 9, 2023

(65) Prior Publication Data

US 2023/0145619 A1     May 11, 2023

Related U.S. Application Data

(63) Continuation of application No. PCT/CN2021/102157, filed on Jun. 24, 2021.

(30) Foreign Application Priority Data

Jul. 10, 2020     (CN) .......................... 202010662411.2

(51) Int. Cl.
B65G 1/137          (2006.01)
B65G 1/04          (2006.01)
          (Continued)

(52) U.S. Cl.
CPC ......... B65G 1/1373 (2013.01); B65G 1/0435 (2013.01); B65G 1/0492 (2013.01);
          (Continued)

(58) Field of Classification Search
CPC .. B65G 1/1373; B65G 1/0435; B65G 1/0492; B65G 2203/04; B65G 2203/044;
          (Continued)

(56)          References Cited

FOREIGN PATENT DOCUMENTS

CN          109186461 A          1/2019
CN          208500277 U          2/2019
          (Continued)

OTHER PUBLICATIONS

International Search Report for PCT/CN2021/102157; mailed Sep. 28, 2021.
          (Continued)

*Primary Examiner* — Ernesto A Suarez
*Assistant Examiner* — Laurence R Brothers
(74) *Attorney, Agent, or Firm* — Slater Matsil, LLP

(57)          ABSTRACT

A goods picking apparatus includes a goods picking assembly, a sensor, and a depth determining module; the sensor is provided on the goods picking assembly and configured to collect a measurement signal when the goods picking assembly extends; the depth determining module is configured to determine a depth of a goods container according to the measurement signal; and the goods picking assembly is configured to pick or place the goods container according to the depth of the goods container, where the depth is a length of the goods container in an extension direction of the goods picking assembly during goods picking.

21 Claims, 7 Drawing Sheets a measurement signal is collected by a sensor of the goods picking apparatus during a goods picking assembly of the goods picking apparatus extends          S1001 a depth of a goods container is determined by a depth determining module of the goods picking apparatus according to the measurement signal. The depth is a length of the goods container in an extension direction of the goods picking assembly          S1002 the goods container is picked or placed by the goods picking assembly of the goods picking apparatus according to the depth of the goods container          S1003

(51) Int. Cl.
  *G06T 7/50* (2017.01)
  *B25J 9/16* (2006.01)

(52) U.S. Cl.
  CPC ............ *G06T 7/50* (2017.01); *B65G 2203/04* (2013.01); *B65G 2203/044* (2013.01); *G05B 2219/45063* (2013.01); *G06T 2207/10028* (2013.01)

(58) Field of Classification Search
  CPC ............ G06T 7/50; G06T 2207/10028; G05B 2219/45063
  See application file for complete search history.

(56) References Cited

FOREIGN PATENT DOCUMENTS

| | | | | | |
|---|---|---|---|---|---|
| CN | 109573449 | A | | 4/2019 | |
| CN | 110834897 | A | | 2/2020 | |
| CN | 111017460 | A | | 4/2020 | |
| CN | 111348361 | A | * | 6/2020 | ........... B65G 1/1373 |
| CN | 111348362 | A | | 6/2020 | |
| CN | 213084340 | U | | 4/2021 | |
| EP | 1306345 | A1 | | 5/2003 | |
| JP | H09142617 | A | | 6/1997 | |
| JP | 2012093278 | A | | 5/2012 | |
| JP | 2015040126 | A | | 3/2015 | |
| JP | 2016037343 | A | * | 3/2016 | |
| JP | 2016155651 | A | * | 9/2016 | |
| RU | 2551405 | C2 | | 5/2015 | |

OTHER PUBLICATIONS

Cited in the search/examination report of RU2023102929.
Notice of Reasons for Refusal of JP2023-501446.
Cited in the search/examination report of EP21838789.2.

* cited by examiner

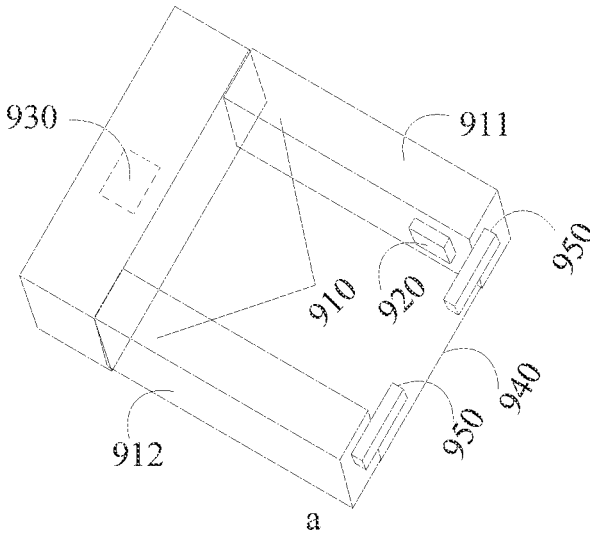

FIG. 10

| | |
|---|---|
| a measurement signal is collected by a sensor of the goods picking apparatus during a goods picking assembly of the goods picking apparatus extends | S1001 |
| a depth of a goods container is determined by a depth determining module of the goods picking apparatus according to the measurement signal. The depth is a length of the goods container in an extension direction of the goods picking assembly | S1002 |
| the goods container is picked or placed by the goods picking assembly of the goods picking apparatus according to the depth of the goods container | S1003 |

FIG. 11

GOODS PICKING APPARATUS, DEPTH MEASUREMENT METHOD, WAREHOUSING ROBOT, AND WAREHOUSING SYSTEM

CROSS-REFERENCE TO RELATED APPLICATIONS

The present disclosure is a continuation of International Patent Application No. PCT/CN2021/102157 filed on Jun. 24, 2021, which claims priority to Chinese patent application No. 202010662411.2 filed with the China National Intellectual Property Administration on Jul. 10, 2020 and entitled "GOODS PICKING APPARATUS, DEPTH MEASUREMENT METHOD, WAREHOUSING ROBOT, AND WAREHOUSING SYSTEM", the disclosures of which are herein incorporated by reference in their entirety.

TECHNICAL FIELD

The present disclosure relates to the technical field of intelligent warehousing, and in particular to a goods picking apparatus, a depth measurement method, a warehousing robot, and a warehousing system.

BACKGROUND

A warehousing robot uses an intelligent operating system, and implements automated retrieval and storage of goods through system instructions; in addition, the system can operate 24 hours a day without interruption to replace manual management and operation, and thus improves the efficiency of warehousing and has been widely applied and favored.

However, for existing intelligent warehousing systems, the warehousing robot always performs retrieval and placement according to an experience value or a default value in the process of picking a goods container, so that the damage or falling of the goods container is easily caused in the process of placing the goods container.

SUMMARY

Embodiments of the present disclosure provide a goods picking apparatus, a depth measurement method, a warehousing robot, and a warehousing system, achieves the measurement of a depth of a goods container to be picked, and places the goods container according to the depth of the goods container, so that the safety of placing the goods container is improved.

In a first aspect, embodiments of this disclosure provide a goods picking apparatus. The goods picking apparatus includes: a goods picking assembly, a sensor, and a depth determining module. The sensor is provided on the goods picking assembly and configured to collect a measurement signal when the goods picking assembly extends. The depth determining module is configured to determine a depth of a goods container according to the measurement signal. The goods picking assembly is configured to pick or place the goods container according to the depth of the goods container. The depth is a length of the goods container in an extension of the goods picking assembly direction.

Optionally, the goods picking assembly includes a left arm and a right arm. The left arm and the right arm are symmetrically arranged; and correspondingly, the sensor is provided on at least one of the left arm and the right arm of the goods picking assembly.

Optionally, the measurement signal comprises a default signal and a preset obstruction signal, the default signal is a corresponding signal in a case that the sensor is not obstructed by the goods container, and the preset obstruction signal is a corresponding signal in a case that the sensor is obstructed by the goods container. The depth determining module is further configured to obtain, in a case that the measurement signal is changed from a default signal to a preset obstruction signal, a first state of the goods picking assembly; obtain, in a case that the measurement signal is changed from the preset obstruction signal to the default signal, a second state of the goods picking assembly; and determine the depth of the goods container according to the first state and the second state.

Optionally, the first state includes a first extension length of the goods picking assembly, and the second state includes a second extension length of the goods picking assembly, the depth determining module is further configured to determine the depth of the goods container according to a difference value between the first extension length and the second extension length.

Optionally, the sensor is a pair of through-beam sensors. The pair of through-beam sensors include an emitting sensor and a receiving sensor. The emitting sensor and the receiving sensor are symmetrically arranged on the left arm and the right arm. Correspondingly, the preset obstruction signal is an output signal of the receiving sensor in a case that the receiving sensor does not receive a signal from the emitting sensor; and the default signal is an output signal of the receiving sensor in a case that the receiving sensor receives the signal from the emitting sensor.

Optionally, the sensor includes at least two pairs of through-beam sensors. Each pair of through-beam sensors are symmetrically arranged on the left arm and the right arm. There is a set interval between two adjacent groups of through-beam sensors. Correspondingly, the depth determining module is further configured to determine the depth of the goods container according to the set interval and measurement signals collected by the at least two pairs of through-beam sensors.

Optionally, the sensor comprises N+1 pairs of through-beam sensors; each pair of through-beam sensors are symmetrically arranged on the left arm and the right arm, and there is a set interval between two adjacent groups of through-beam sensors, where N is greater than or equal to 1. The depth determining module is further configured to: determine, when output signals of receiving sensors of at least two pairs of through-beam sensors are the default signals and an $M^{th}$ receiving sensor is the closest receiving sensor to a first receiving sensor among the receiving sensors of which the output signals are default signals, $(M-1)*L$ to be the depth of the goods container, where M is a positive integer less than or equal to N, L is the set interval, and the first receiving sensor is the receiving sensor located at an end of the goods picking assembly in the extension direction of the goods picking assembly.

Optionally, the sensor is a visual sensor. The visual sensor is arranged on an upper surface of the goods picking assembly. The measurement signal is a measurement image of a working region of the goods picking assembly photographed by the visual sensor.

Optionally, the sensor is a distance measurement sensor. The distance measurement sensor is arranged at an inner side of the left arm or the right arm. The measurement signal is a measurement distance outputted by the distance measurement sensor.

Optionally, the goods picking assembly further includes a pushing rod assembly. The pushing rod assembly is movably mounted at one end of the goods picking assembly in the extension direction of the goods picking assembly; and after depth determining module determines the depth of the goods container, the pushing rod assembly inwards rotates to a state of being perpendicular to an inner side surface of the goods picking assembly.

Optionally, the depth determining module is further configured to: obtain a preset arm extension distance; obtain, in a case that an arm extension distance of the goods picking assembly reaches the preset arm extension distance, a measurement signal outputted by the sensor; control, in a case that the measurement signal is the default signal, the goods picking assembly to pick the goods container; and generate, in a case that the measurement signal is the preset obstruction signal, preset arm extension distance error information.

In a second aspect, the present disclosure further provides a depth measurement method. The method is executed by a goods picking apparatus of a warehousing robot. The method includes: collecting, by a sensor of the goods picking apparatus, a measurement signal during a goods picking assembly of the goods picking apparatus extends; determining, by a depth determining module of the goods picking apparatus, a depth of a goods container according to the measurement signal; picking or placing by the goods picking assembly, the goods container according to the depth of the goods container, where the depth is a length of the goods container in an extension direction of the goods picking assembly.

Optionally, the goods picking assembly includes a left arm and a right arm, and the determining a depth of a goods container according to the measurement signal includes: obtaining, in a case that the measurement signal is changed from a default signal to a preset obstruction signal, a first state of the goods picking assembly; obtaining, in a case that the measurement signal is changed from the preset obstruction signal to the default signal, a second state of the goods picking assembly; and determining the depth of the goods container according to the first state and the second state.

Optionally, the sensor comprises a pair of through-beam sensors. The pair of through-beam sensors include an emitting sensor and a receiving sensor. The emitting sensor and the receiving sensor are symmetrically arranged on the left arm and the right arm. The preset obstruction signal is an output signal of the receiving sensor in a case that the receiving sensor does not receive a signal from the emitting sensor; and the default signal is an output signal of the receiving sensor in a case that the receiving sensor receives the signal from the emitting sensor.

Optionally, the sensor includes at least two pairs of through-beam sensors. Each pair of through-beam sensors are symmetrically arranged on the left arm and the right arm, and there is a set interval between two adjacent groups of through-beam sensors. The determining a depth of a goods container according to the measurement signal includes: determining the depth of the goods container according to the set interval and measurement signals collected by the at least two pairs of through-beam sensors.

Optionally, the sensor is a visual sensor. The visual sensor is arranged on an upper surface of the goods picking assembly. The collecting, by a sensor of the goods picking apparatus, a measurement signal during a goods picking assembly of the goods picking apparatus extends includes: photographing, by the visual sensor, a measurement image of a working region of the goods picking assembly during the goods picking assembly of the goods picking apparatus extends; and correspondingly, the determining a depth of a goods container according to the measurement signal includes: determining the depth of the goods container according to the measurement image.

Optionally, the sensor is a distance measurement sensor. The distance measurement sensor is arranged at an inner side of the left arm or the right arm. The collecting, by a sensor of the goods picking apparatus, a measurement signal during a goods picking assembly of the goods picking apparatus extends includes: collecting, by the distance measurement sensor, a measurement distance during the goods picking assembly of the goods picking apparatus extends; and correspondingly, the determining a depth of a goods container according to the measurement signal includes: determining the depth of the goods container according to the measurement distance.

Optionally, the goods picking assembly further includes a pushing rod assembly. The pushing rod assembly is movably mounted at one end of the goods picking assembly in the extension direction of the goods picking assembly; and after determining the depth of the goods container according to the measurement signal, the depth measurement method further includes: controlling the pushing rod assembly to inwards rotate to a state of being perpendicular to an inner side surface of the goods picking assembly; and picking the goods container according to the depth of the goods container.

Optionally, after picking the goods container according to the depth of the goods container, the method further includes: placing, according to the depth of the goods container, the goods container on a buffer mechanism of the warehousing robot.

Optionally, the depth measurement method further includes: determining, according to the measurement signal in a case that the goods picking apparatus is initialized, whether there is the goods container on the goods picking assembly of the goods picking apparatus; and wherein the controlling the pushing rod assembly to inwards rotate to a state of being perpendicular to an inner side surface of the goods picking assembly comprises: if it is determined that there is the goods container on the goods picking assembly, controlling the pushing rod assembly to inwards rotate to the state of being perpendicular to the inner side surface of the goods picking assembly.

Optionally, after determining the depth of the goods container according to the measurement signal, the method further includes: obtaining, by the depth determining module, a preset arm extension distance; obtaining, in a case that an arm extension distance of the goods picking assembly reaches the preset arm extension distance, the measurement signal outputted by the sensor; controlling, in a case that the measurement signal is the default signal, the goods picking assembly to pick the goods container according to the depth of the goods container; and generating, in a case that the measurement signal is the preset obstruction signal, preset arm extension distance error information.

In a third aspect, the present disclosure further provides a warehousing robot, including a moving chassis and the goods picking apparatus provided by any embodiment of the present disclosure, where the goods picking apparatus is connected to the moving chassis and configured to pick or place the goods container according to a depth of the goods container.

Optionally, the warehousing robot further includes: a buffer mechanism, mounted on the moving chassis and configured to place the goods container; and correspondingly, the goods picking apparatus, further configured to:

place the goods container on the buffer mechanism according to the depth of the goods container.

In a fourth aspect, the present disclosure further provides a warehousing system, including the warehousing robot provided by an embodiment corresponding to the third aspect of the present disclosure, a goods shelf, and a warehouse management module. The warehousing robot is connected to the warehouse management module and configured to: move, according to an instruction of the warehouse management module, to a position where the goods container is located, and pick the goods container, where the goods container is placed on the goods shelf; or move to a position where the goods container is to be placed according to an instruction of the warehouse management module. and place the goods container to the position.

In a fifth aspect, the present disclosure further provides a computer readable storage medium. The computer readable storage medium stores computer executable instructions. The computer executable instructions, when executed by a processor, are configured to implement the depth measurement method provided by any embodiment of the present disclosure.

According to the goods picking apparatus, the depth measurement method, the warehousing robot, and the warehousing system provided by the embodiments of the present disclosure, the sensor is provided on the goods picking assembly of the goods picking apparatus, and through the depth determining module, the depth of the goods container is determined according to the measurement signal collected by the sensor, so that the goods container is picked and placed according to the depth of the goods container, and thus, the efficiency and safety of picking and placing the goods container are improved, the probability of the damaging and falling of the goods container during placement is effectively reduced, and the degree of intelligence and working efficiency of the warehousing robot are improved.

BRIEF DESCRIPTION OF THE DRAWINGS

The accompanying drawings here, which are incorporated into the specification and constitute a part of the specification, illustrate embodiments that conform to the present disclosure and are used together with the specification to explain the principles of the present disclosure.

FIG. 10 is a schematic structural diagram of a goods picking apparatus with a pushing rod assembly being in a working state in an embodiment shown in FIG. 9;

FIG. 11 is a flowchart of a depth measurement method provided by one embodiment of the present disclosure;

Specific embodiments of the present disclosure are shown by the above drawings, and more detailed description will be given below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments will be described here in detail, and examples thereof are represented in the accompanying drawings. When the following description relates to the accompanying drawings, unless otherwise indicated, the same numbers in different accompanying drawings represent the same or similar elements. The implementations described in the following exemplary embodiments do not represent all implementations consistent with the disclosure. On the contrary, they are merely examples of apparatuses and methods consistent with some aspects of the disclosure as detailed in the appended claims.

The technical solutions of the present disclosure and how the technical solutions solve the above technical problems are described in detail in the specific embodiments hereinafter. The following specific embodiments may be combined with each other, and the same or similar concepts or processes may not be described in some embodiments. The embodiments of the present disclosure are described below with reference to the accompanying drawings.

The application scenarios of the embodiments of the present disclosure are described below.

Figure 1:
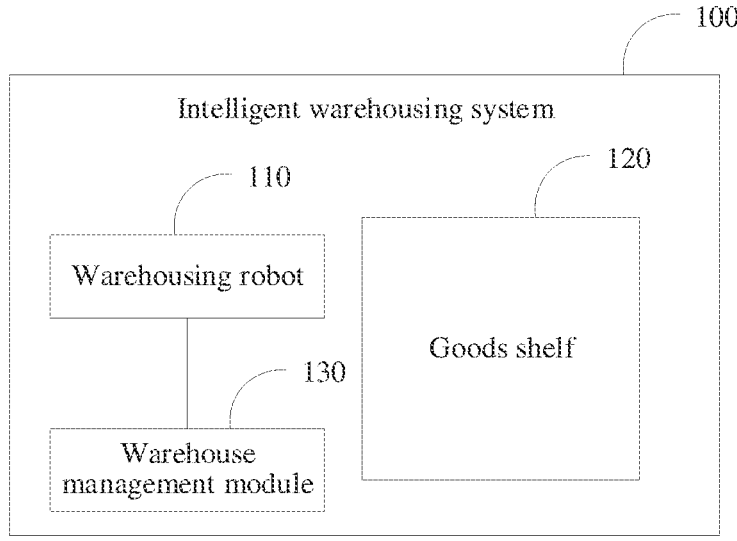
FIG. 1 is a diagram of an application scenario provided by an embodiment of the present disclosure.

FIG. 1 is a diagram of an application scenario provided by an embodiment of the present disclosure. As shown in FIG. 1, an intelligent warehousing system 100 uses a warehousing robot 110 to pick and store a target goods container on a goods shelf 120, and uses a warehouse management module 130 to control the warehousing robot 110 to move to a set position to pick and store the target goods container. The warehouse management module 130 further stores the storage information of each storage position of the goods shelf 120 and the basic information of the target goods container, thereby facilitating warehouse management.

In a scenario that the target goods container is picked up through the warehousing robot, in a case that the warehousing robot in the intelligent warehousing system provided by the related art picks or places goods containers, for the goods containers having various sizes, picking and placing are performed only according to a preset fixed mode. For a goods container having a large size, during placing, the damage of the goods container is easily caused due to the use of a default pushing and placing distance. Moreover, for a goods container having a small size, during placing, the goods container cannot be placed at a deepest position due to the use of the default pushing and placing distance, so that the goods container easily slides out or falls during movement. In order to solve the problems, the goods picking apparatus provided by the embodiments of the present disclosure includes a depth determining module and a sensor provided on a goods picking assembly, and the depth determining module can determine a depth of the goods container according to a measurement signal collected by the sensor, so that the adaptive picking and placing of the goods container can be performed according to the depth of the goods container, the safety of picking and placing the goods container is improved, and the probability of the damaging and falling of the goods container during placement is effectively reduced.

Figure 2:
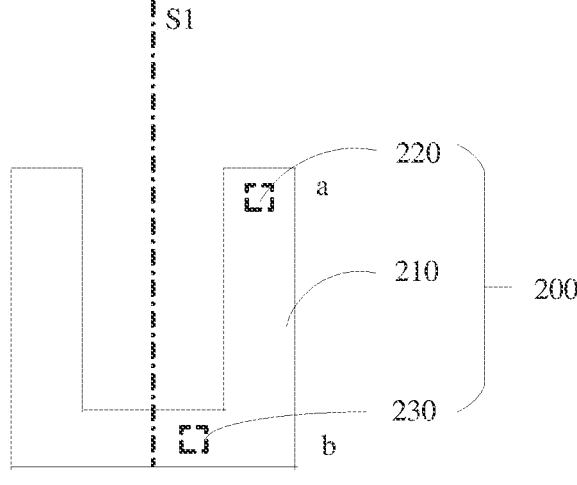
FIG. 2 is a schematic structural diagram of a goods picking apparatus provided by an embodiment of the present disclosure.

FIG. 2 is a schematic structural diagram of a goods picking apparatus provided by an embodiment of the present disclosure. The goods picking apparatus is applied to a warehousing robot. As shown in FIG. 2, the goods picking apparatus 200 provided by this embodiment includes a goods picking assembly 210, a sensor 220, and a depth determining module 230.

The sensor 220 is provided on the goods picking assembly 210 and configured to collect a measurement signal when the goods picking assembly 210 extends. The depth determining module 230 is configured to determine a depth of a goods container according to the measurement signal. The goods picking assembly 210 is configured to pick or place the goods container according to the depth of the goods container. The depth is a length of the goods container in an extension direction of the goods picking assembly 210 in a case that the goods picking assembly 210 performs goods picking. The depth determining module 230 can be integrated or provided on an integrated circuit, a chip or other electronic device, such as a processor, of the goods picking apparatus 200.

Specifically, as shown in FIG. 2, the goods picking apparatus 200 has a central axis Si that is horizontally arranged, and a depth direction of the goods container is a direction where the central axis Si is located. The sensor 220 can be provided at a set position of a tail end a of an upper surface of the goods picking assembly 210, and can also be provided at a set position of a tail end a of an inner surface of the goods picking assembly 210. The set position specifically needs to be determined according to the type of the sensor. The tail end a refers to one end of the goods picking assembly 210 close to the goods container before goods picking. The depth determining module 230 can be provided at one end of the goods picking assembly 210 distant from the goods container, i.e., one end where the root portion b of the goods picking assembly is located, be electrically connected to the sensor 220, receive a measurement signal from the sensor 220, and determine the depth of the goods container according to the measurement signal.

Specifically, the goods picking assembly 210 can be in the form of a mechanical arm, also can be a fork, or other mechanical structural form used for picking the goods container.

Furthermore, the goods picking apparatus 200 can move along a vertical direction, such as moving to a set height according to a moving instruction. The set height generally is a height of a storage position where the goods container is located, such as the height of a goods plate of the storage position. For example, the movement of the goods picking apparatus 200 in the vertical direction can be achieved through a lifting or lowering platform or a lifting or lowering assembly. Moreover, according to a picking instruction, the goods picking apparatus makes the goods picking assembly 210 horizontally extend forwards, and starts the sensor 220 to collect the measurement signal and send the measurement signal to the depth determining module 230. The depth determining module 230 determines the depth of the goods container according to the measurement signal.

Figure 3:
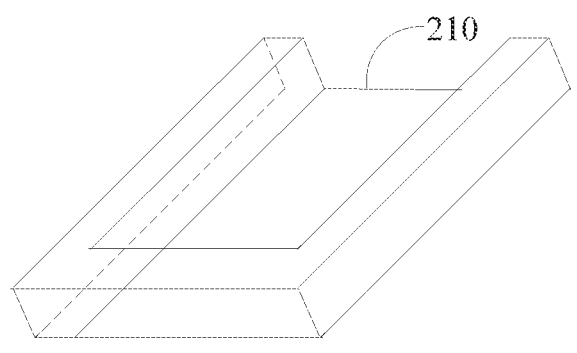
FIG. 3 is a schematic structural diagram of a goods picking assembly according to an embodiment shown in FIG. 2.
Figure 4:
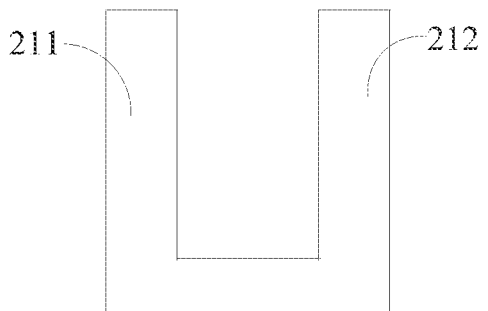
FIG. 4 is a schematic structural diagram of a goods picking assembly according to an embodiment shown in FIG. 2.

Specifically, FIG. 3 is a schematic structural diagram of a goods picking assembly according to an embodiment shown in FIG. 2. As shown in FIG. 3, the goods picking assembly 210 is an integrated structure, specifically is a rectangular structure with an opening defined in one end, and of course, can also be other shape. This is not limited in the embodiments of the present disclosure. In the process of picking the goods container, the goods container is placed on the goods picking assembly 210. FIG. 4 is a schematic structural diagram of a goods picking assembly according to an embodiment shown in FIG. 2. As shown in FIG. 4, the goods picking assembly 210 can include a left arm 211 and a right arm 212, and in the process of picking the goods container, the goods container is placed between the left arm 211 and the right arm 212. The left arm 211 and the right arm 212 are symmetrically arranged, may be made of the same material, and may have the same size. Each of the goods picking assembly 210, the left arm 211, and the right arm 212 could be a telescopic goods picking assembly, and may include an inner section arm and an outer section arms. The inner section arm may be mounted to the outer section arm, and the inner section arm could move along the length directions of the outer section arm, i.e., moving along a direction where the aforementioned central axis 51 is located, so that the stretching and retracting of the goods picking assembly are achieved.

Specifically, the number of the sensor 220 can be 1, 2, 4, or other numerical values. The sensor can be a distance measurement sensor, such as a laser distance measurement sensor or an ultrasonic distance measurement sensor, and can be arranged at an inner side of the left arm 211 or the right arm 212 of the goods picking assembly 210, so as to measure a distance between the left arm 211 and the right arm 212 of the goods picking assembly 210. Moreover, in a case that the goods container is picked, a distance between the goods picking assembly where the distance measurement sensor is located (the left arm 211 or the right arm 212) and the goods container is measured. The sensor can further be a through-beam sensor, such as a through-beam photoelectric sensor or a through-beam infrared sensor. Generally, a group of or a pair of through-beam sensors include an emitting sensor and a receiving sensor that can be respectively arranged on the left arm 211 and the right arm 212 of the goods picking assembly 210. The sensor can further be a visual sensor, such as a 2D camera, a depth camera, or a radar, and is provided on an upper surface of the goods picking assembly 210.

Optionally, the depth determining module 230 is further configured to: obtain, in a case that the measurement signal is changed from a default signal to a preset obstruction signal, a first state of the goods picking assembly; obtain, in a case that the measurement signal is changed from the preset obstruction signal to the default signal, a second state of the goods picking assembly; and determine the depth of the goods container according to the first state and the second state.

The default signal can be a corresponding signal in a case that the sensor 220 is not obstructed by the goods container. For example, the default signal can be a signal collected by the sensor 220 in a case that the goods container is not in contact with the goods picking assembly 210, or the goods container is not located in a working region of the goods picking assembly 210, where the working region of the goods picking assembly 210 refers to a region between the left arm 211 and the right arm 212 of the goods picking assembly 210, or a region of the goods picking assembly 210 configured to pick the goods container. The preset obstruction signal then corresponds to a corresponding signal in a case that the sensor 220 is obstructed by the goods container. For example, the preset obstruction signal can be a signal collected by the sensor 220 in a case that the goods container is in contact with the goods picking assembly 210, or the goods container is located in the working region of the goods picking assembly 210.

Specifically, the first state can include a first extension length of the goods picking assembly 210, and the second state can include a second extension length of the goods picking assembly 210. Correspondingly, the determining the depth of the goods container according to the first state and the second state includes: determining the depth of the goods container according to a difference value between the first extension length and the second extension length.

Furthermore, in a case that the measurement signal of the sensor 220 is changed from the preset obstruction signal to the default signal, i.e., the sensor 220 is changed from a state of being obstructed by the goods container to a state of being not obstructed by the goods container, it indicates that the current extension length of the goods picking assembly exceeds the depth of the goods container. In this case, the goods picking assembly 210 can stop an extension action, or continues to forwards extend by a preset length so as to facilitate stopping extension; and pick the goods container in a case that a goods container picking instruction is received. The degree of adaptation and efficiency of goods container picking are improved by using a manner of picking the goods container on the basis of the depth of the goods container.

According to the goods picking apparatus provided by this embodiment, the sensor is provided on the goods picking assembly of the goods picking apparatus, and through the depth determining module, the depth of the goods container is determined according to the measurement signal collected by the sensor, so that the goods container is picked and placed according to the depth of the goods container, and thus, the efficiency and safety of picking and placing the goods container are improved, the probability of the damaging and falling of the goods container during placement is effectively reduced, and the degree of intelligence and working efficiency of the warehousing robot are improved.

Figure 5:
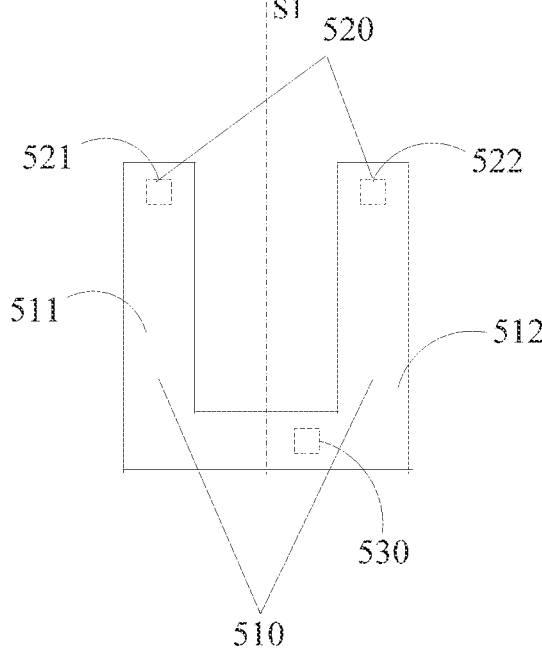
FIG. 5 is a schematic structural diagram of a goods picking apparatus provided by another embodiment of the present disclosure.

Optionally, FIG. 5 is a schematic structural diagram of a goods picking apparatus provided by another embodiment of the present disclosure. This embodiment further describes the sensors on the basis of the embodiment shown in FIG. 2. As shown in FIG. 5, the goods picking apparatus includes a goods picking assembly 510, sensors 520, and a depth determining module 530. The goods picking assembly 510 includes a left arm 511 and a right arm 512 that are symmetrically arranged. The sensors 520 are a pair of through-beam sensors and include an emitting sensor 521 and a receiving sensor 522. The emitting sensor 521 and the receiving sensor 522 are symmetrically arranged on the left arm 511 and the right arm 512 of the goods picking assembly 510.

Correspondingly, the preset obstruction signal corresponds to an output signal of the receiving sensor 522 in a case that the receiving sensor 522 does not receive a signal from the emitting sensor 521. The default signal corresponds to an output signal of the receiving sensor 522 in a case that the receiving sensor 522 receives the signal from the emitting sensor 521.

Specifically, the pair of through-beam sensors can be through-beam photoelectric sensors, such as the through-beam infrared sensors. When the goods picking assembly 510 extends, the emitting sensor 521 emits a sensor signal, such as a light signal or an infrared signal, to the receiving sensor 522, and the receiving sensor 522 receives the sensor signal and outputs a measurement signal. In a case that the receiving sensor 522 can receive the sensor signal, the measurement signal outputted by the receiving sensor is the default signal, such as high level. However, in a case that the receiving sensor 522 cannot receive the sensor signal, the measurement signal outputted by the receiving sensor is the preset obstruction signal, such as low level. Correspondingly, the depth determining module 530 can determine the depth of the goods container according to a change of the measurement signal outputted by the receiving sensor 522.

Furthermore, in a case that the measurement signal received by the depth determining module 530 is changed from the preset obstruction signal to the default signal, the depth determining module 530 can further emit a movement stopping instruction to the goods picking assembly 510. The goods picking assembly 510 can stop the extension action according to the movement stopping instruction. Moreover, the depth determining module 530 can further emit a closing signal to the sensors 520 to close the sensors 520.

Optionally, the depth determining module 530 is further configured to: obtain a preset arm extension distance; obtain, in a case that an arm extension distance of the goods picking assembly reaches the preset arm extension distance, the measurement signal outputted by the sensor; control, in a case that the measurement signal is the default signal, the goods picking assembly to pick the goods container; and generate, in a case that the measurement signal is the preset obstruction signal, preset arm extension distance error information.

Specifically, in a case that the measurement signal is the preset obstruction signal, after the preset arm extension distance error information is generated, it can further be continued to control the goods picking assembly to extend until the measurement signal is changed to be the default signal, and the goods picking assembly is controlled to pick the goods container.

Furthermore, the depth determining module 530 is further configured to: receive the preset arm extension distance from the warehousing robot or a warehousing system; obtain, in a case that the arm extension distance of the goods picking assembly 510 reaches the preset arm extension distance, the measurement signals outputted by the receiving sensors 522; pick, in a case that the measurement signals outputted by the receiving sensors 522 are the default signals, the goods container; and determine, in a case that the measurement signals are the preset obstruction signals, that the preset arm extension distance is not correct, so that the goods container does not need to be picked according to the preset arm extension distance. In this case, the goods picking assembly 510 can further extend and obtain the measurement signals outputted by the receiving sensors 522 until the measurement signals outputted by the receiving sensors 522 are the default signal, and pick the goods container.

In this embodiment, the depth of the goods container is determined by providing a pair of through-beam sensors and the depth determining module, and subsequent picking and placing of the goods container are instructed according to the depth of the goods container, and thus, the depth determining efficiency is high, the sensitivity is high, the cost is low, this embodiment is easy to implement, and the safety of picking and placing the goods container is improved.

Figure 6:
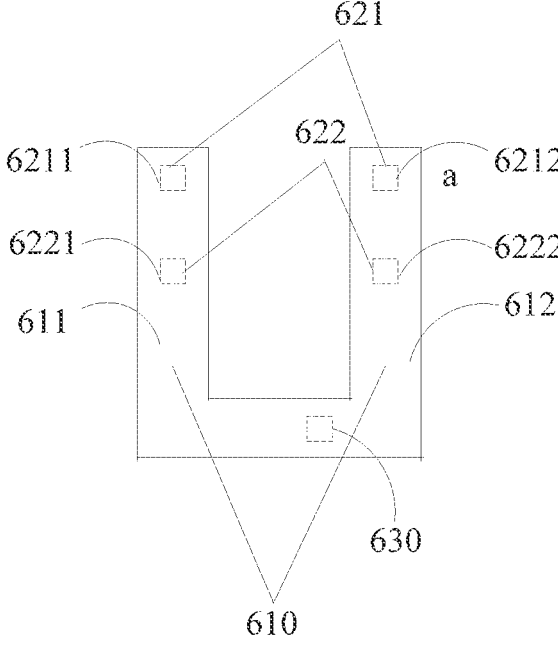
FIG. 6 is a schematic structural diagram of a goods picking apparatus provided by another embodiment.

FIG. 6 is a schematic structural diagram of a goods picking apparatus provided by another embodiment of the present disclosure. This embodiment further describes the sensors on the basis of the embodiment shown in FIG. 2. As shown in FIG. 6, the goods picking apparatus includes a goods picking assembly 610, first through-beam sensors 621, second through-beam sensors 622, and a depth determining module 630.

The goods picking assembly 610 includes a left arm 611 and a right arm 612 that are symmetrically arranged. The sensors are two pairs of through-beam sensors, and according to an ascending order of distance from the goods container, sequentially are the first through-beam sensors 621 and the second through-beam sensors 622. The first through-beam sensors 621 include a first emitting sensor 6211 and a first receiving sensor 6212. The second through-beam sensors 622 include a second emitting sensor 6221 and a second receiving sensor 6222. The first emitting sensor 6211 and the second emitting sensor 6221 are arranged on the left arm 611. The first receiving sensor 6212 and the second receiving sensor 6222 are arranged at the positions of the right arm 612 corresponding to corresponding emitting sensors. The first through-beam sensors 621 and the second through-beam sensors 622 maintain a set interval. The depth determining module 630 is configured to determine the depth of the goods container according to the set interval and measurement signals collected by the at least two pairs of through-beam sensors.

The set interval can be any one fixed interval, and can be a default value, a user-defined value, or a value determined according to the size of the goods picking assembly 610, such as 10 cm, 15 cm, or other values.

It is to be understood that in FIG. 6, description is made by using two pairs of through-beam sensors as an example. The pair of through-beam sensors can include at least two pairs of through-beam sensors, such as 3 pairs, 4 pairs, or even more pairs. Each pair of through-beam sensors include an emitting sensor and a receiving sensor. The emitting sensor and the receiving sensor are symmetrically arranged on the left arm 611 and the right arm 612 of the goods picking assembly 610, and there is a set interval between two adjacent groups of through-beam sensors.

Specifically, the first through-beam sensors 621 are sensors located at a tail end a of the goods picking assembly 610. The tail end a of the goods picking assembly 610 is an end of the goods picking assembly 610 close to the goods container. In some embodiments, all the through-beam sensors can be started while the left arm 611 and the right arm 612 extend, i.e., the first through-beam sensors 621 and the second through-beam sensors 622 are started. While in other embodiments, when the left arm 611 and the right arm 612 extend, only the first through-beam sensor 621 is started, and the other through-beam sensors maintain closed. In a case that the measurement signal outputted by the first receiving sensor 6212 of the first through-beam sensor 621 is changed from the preset obstruction signal to the default signal, it is determined that an arm extension stroke of the current goods picking assembly 610 satisfies a goods container picking condition, and then the other through-beam sensors are started, i.e., starting the second through-beam sensors 622. When it is determined that the picking condition is satisfied, in a case that the output signals of the first receiving sensor 6212 and the second receiving sensor 6222 both are the default signal, the depth determining module 630 determines that the set interval is the depth of the goods container.

Furthermore, in a case that the through-beam sensors include more pairs, such as N+1, where N is greater than or equal to 1, when it is determined that the picking condition is satisfied and the output signals of the receiving sensors of at least two pairs of through-beam sensors are the default signal, an $M^{th}$ receiving sensor is the closest receiving sensor to the first receiving sensor 6212 among the receiving sensors of which the output signals are default signals, M is a positive integer less than or equal to N, and the depth determining module 630 determines $(M-1)*L$ to be the depth of the goods container, where L is the set interval.

In this embodiment, the depth of the goods container is determined by providing a plurality of pairs of through-beam sensors and the depth determining module, and subsequent picking and placing of the goods container are instructed according to the depth of the goods container, and thus, the depth determining efficiency is high, this embodiment is easy to implement, and the safety of picking and placing the goods container is improved.

Figure 7:
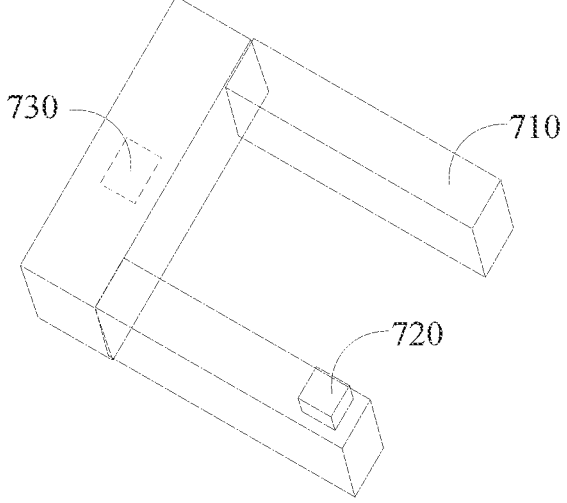
FIG. 7 is a schematic structural diagram of a goods picking apparatus provided by another embodiment of the present disclosure.

FIG. 7 is a schematic structural diagram of a goods picking apparatus provided by another embodiment of the present disclosure. This embodiment further describes the sensor on the basis of the embodiment shown in FIG. 2. As shown in FIG. 7, the goods picking apparatus includes a goods picking assembly 710, a sensor 720, and a depth determining module 730. The sensor 720 is a visual sensor, such as a 2D camera, a depth camera, or a photographing apparatus, and is provided on an upper surface of the goods picking assembly 710 and configured to photograph a measurement image of a working region of the goods picking assembly 710. Correspondingly, the depth determining module 730 is configured to determine the depth of the goods container according to the gray scale of the measurement image.

Furthermore, the sensor 720 can be a micro camera or a micro camera lens.

Specifically, the visual sensor is configured to photograph a measurement image of the working region of the goods picking assembly 710, i.e., the measurement image of a region where the goods picking assembly picks the goods container. In a case that there is the goods container in the working region, the field of view of the visual sensor may be obstructed, so that the picture of the photographed measurement image is dark, i.e., the gray scale of the measurement image is small. A gray scale threshold can be preset. In a case that the average gray scale of the measurement image is less than the preset gray scale threshold, it indicates that there is the goods container in the working region of the goods picking assembly 710. The default signal corresponds to the average gray scale of the measurement image that is greater than the preset gray scale threshold, and then the preset obstruction signal corresponds to the average gray scale of the measurement image that is less than the preset gray scale threshold. Therefore, the visual sensor can determine the depth of the goods container according to the change of the average gray scale of the measurement image. In the case that the visual sensor is the depth camera, the depth camera can be used to collect the point cloud data of the working region of the goods picking assembly 710, and further the depth of the goods container is determined according to the point cloud data. A specific determination algorithm is similar to the measurement image, and can be performed according to the average value of the point cloud data. In a case that the average value is less than a preset threshold, it indicates that the field of view is obstructed and corresponds to the preset obstruction signal; and in a case that the average value is greater than the preset threshold, it indicates that the field of view is not obstructed and corresponds to the default signal.

In this embodiment, the depth of the goods container is determined by providing the visual sensor and the depth determining module, and subsequent picking and placing of the goods container are instructed according to the depth of the goods container, and thus, the depth determining efficiency is high, the accuracy high, this embodiment is easy to implement, and the safety of picking and placing the goods container is improved.

Figure 8:
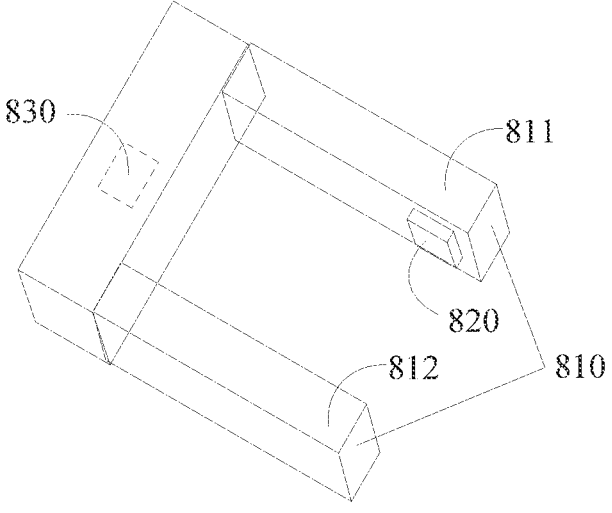
FIG. 8 is a schematic structural diagram of a goods picking apparatus provided by another embodiment of the present disclosure.

FIG. 8 is a schematic structural diagram of a goods picking apparatus provided by another embodiment of the present disclosure. This embodiment further describes the sensor on the basis of the embodiment shown in FIG. 2. As shown in FIG. 8, the goods picking apparatus includes a goods picking assembly 810, a sensor 820, and a depth determining module 830. The goods picking assembly 810 includes a left arm 811 and a right arm 812 that are symmetrically arranged. The sensor 820 is a distance measurement sensor that is arranged at an inner side of the left arm 811 or the right arm 812. FIG. 8 illustrates an example in which the distance measurement sensor is arranged on the left arm 811. The measurement signal is a measurement distance outputted by the distance measurement sensor.

Specifically, there may be one or more distance measurement sensors, and the distance measurement sensors can be ultrasonic sensors, radars, etc.

In a case that the measurement distance is a distance between the left arm 811 and the right arm 812, the measurement distance corresponds to the aforementioned default signal. However, in a case that the measurement distance is less than the distance between the left arm 811 and the right arm 812, the measurement distance indicates the distance between the goods picking assembly where the distance measurement sensor is located and the goods container, and corresponds to the aforementioned preset obstruction signal. Therefore, the depth determining module 830 can determine the depth of the goods container according to a change of the measurement distance.

In this embodiment, the depth of the goods container is determined by providing the distance measurement sensor and the depth determining module, and subsequent picking and placing of the goods container are instructed according to the depth of the goods container, and thus, the depth determining efficiency is high, the cost is low, this embodiment is easy to implement, and the safety of picking and placing the goods container is improved.

Figure 9:
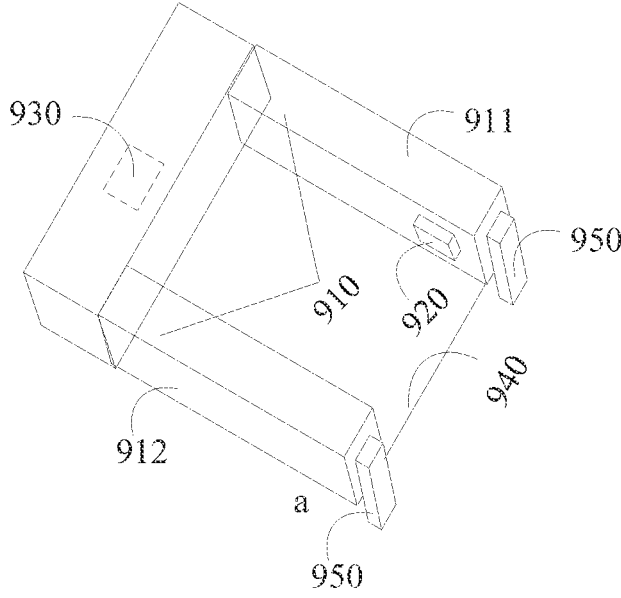
FIG. 9 is a schematic structural diagram of a goods picking apparatus provided by another embodiment of the present disclosure.

FIG. 9 is a schematic structural diagram of a goods picking apparatus provided by another embodiment of the present disclosure. This embodiment further refines the structure of the goods picking assembly on the basis of the embodiment shown in FIG. 2, and increases a pushing rod assembly at the tail end of the goods picking assembly and increases a temporary storage plate. As shown in FIG. 9, the goods picking apparatus provided by this embodiment includes a goods picking assembly 910, a sensor 920, a depth determining module 930, a temporary storage plate 940, and a pushing rod assembly 950. The goods picking assembly 910 includes a left arm 911 and a right arm 912.

The sensor 920 is provided on the goods picking assembly 910 and configured to collect a measurement signal in when the goods picking assembly 910 extends. The depth determining module 930 is configured to determine a depth of a goods container according to the measurement signal. The goods picking assembly 910 is configured to pick or place the goods container according to the depth of the goods container. The depth is a length of the goods container in an extension direction of the goods picking assembly 910 in a case that the goods picking assembly performs goods picking. The temporary storage plate 940 is arranged between the left arm 911 and the right arm 912, and configured to temporarily store the goods container. The pushing rod assembly 950 is movably mounted at one end of the goods picking assembly 910 close to the goods container, and after the goods picking assembly 910 picks the goods container, the pushing rod assembly 950 can inwards rotate to a state of being perpendicular to an inner side surface of the goods picking assembly 910.

Specifically, the temporary storage plate 940 is a rectangular plate structure that is horizontally arranged, and is arranged parallel to a central axis 51. In a case that the goods picking assembly 910 picks the goods container, the goods picking assembly can place the goods container on the temporary storage plate 940, and when reaching a target position, then places the goods container on the temporary storage plate 940 onto a warehousing goods shelf corresponding to the target position for storage. The target position can be a position corresponding to a buffer mechanism of a warehousing robot, and can also be a position corresponding to a fixed goods shelf or a storage position of a warehousing system.

Specifically, the number of the pushing rod assembly 950 can be 2, 4, or other numerical values. FIG. 9 illustrates an example in which there are 2 pushing rod assemblies. The pushing rod assemblies 950 are respectively symmetrically arranged at the tail ends a of the left arm 911 and the right arm 912. In a non-working state, the pushing rod assemblies 950 are vertically downward or vertically upward, or are placed parallel to the height direction of the left arm 911 or the right arm 912 of the goods picking assembly 910. The non-working state corresponds to a state in which the goods picking assembly 910 does not pick the goods container. The pushing rod assemblies 950 can rotate relative to the goods picking assembly 910, and can specifically rotate along the central axis 51 of the goods picking assembly 910. In a case that the goods picking assembly 910 picks the goods container according to a goods container picking instruction, the pushing rod assemblies 950 inwards rotate by 90 degrees until being in the state of being perpendicular to an inner side surface of the left arm 911 or the right arm 912 of the goods picking assembly 910, and in this case, the pushing rod assemblies 950 are in a working state. Specifically, FIG. 10 is a schematic structural diagram of a goods picking apparatus with pushing rod assemblies being in a working state in an embodiment shown in FIG. 9. As shown in FIG. 10, When being in the working state, the pushing rod assemblies 950 inwards rotate until being in the state of being perpendicular to the inner side surface of the left arm 911 or the right arm 912.

Furthermore, in a case that the goods picking apparatus is initialized or starts moving, it can be determined, according to the measurement signal of the sensor 920, whether there is the goods container on the goods picking assembly 910. If there is the goods container on the goods picking assembly 910, the states of the pushing rod assemblies 950 are controlled to be the state of being perpendicular to the inner side surface of the goods picking assembly 910, so as to prevent the goods container from falling during the movement of the goods picking apparatus.

Specifically, the initialization of the goods picking apparatus means that the goods picking apparatus is started, or the goods picking apparatus moves or displaces.

In this embodiment, for the goods picking assembly including the left arm and the right arm, the temporary storage plate is provided for temporarily storing the goods container, and the pushing rod assemblies are increased, and thus, the safety during the movement of the goods container is further improved.

FIG. 11 is a flowchart of a depth measurement method provided by one embodiment of the present disclosure. The depth measurement method is applied to a goods picking apparatus of a warehousing robot and can be executed by the goods picking apparatus. As shown in FIG. 11, the depth measurement method includes the following operations:

In the operation S1001, a measurement signal is collected by a sensor of the goods picking apparatus when a goods picking assembly of the goods picking apparatus extends.

In the operation S1002, a depth of a goods container is determined by a depth determining module of the goods picking apparatus according to the measurement signal. The depth is a length of the goods container in an extension direction of the goods picking assembly.

In the operation S1003, the goods container is picked or placed by the goods picking assembly of the goods picking apparatus according to the depth of the goods container.

The goods container is placed according to the depth of the goods container, specifically including: placing, according to the depth of the goods container, the goods container on a buffer mechanism of the warehousing robot or at a central position of a temporary storage plate, or at a deep position, thereby preventing the goods container from falling during the movement of the warehousing robot due to the fact that a placement position is not good, or preventing goods in the goods container from being damaged due to the fact that the goods container is squeezed during placement.

Specifically, for a goods container having a small depth, the goods container needs to be placed at a deep position of the buffer mechanism as much as possible according to the depth of the goods container, so that the goods container is prevented from sliding out during the movement of the warehousing robot. For a goods container having a large depth, in a case that the goods container is placed on the buffer mechanism, it is to prevent the goods container and even the goods in the goods container from being damaged due to the fact that the goods container is squeezed due to an overlarge pushing and placing distance. That is, for the goods container having the large depth, it is to determine a corresponding pushing and placing distance according to the depth of the goods container, thereby preventing the goods container from being placed at the center of the buffer mechanism while squeezing the goods container.

Optionally, the goods picking assembly includes a left arm and a right arm, and the determining a depth of a goods container according to the measurement signal includes: obtaining, in a case that the measurement signal is changed from a default signal to a preset obstruction signal, a first state of the goods picking assembly; obtaining, in a case that the measurement signal is changed from the preset obstruction signal to the default signal, a second state of the goods picking assembly; and determining the depth of the goods container according to the first state and the second state.

Optionally, the sensor comprises a pair of through-beam sensors. The pair of through-beam sensors include an emitting sensor and a receiving sensor. The emitting sensor and the receiving sensor are symmetrically arranged on the left arm and the right arm. The preset obstruction signal corresponds to an output signal of the receiving sensor in a case that the receiving sensor does not receive a signal from the emitting sensor. The default signal corresponds to an output signal of the receiving sensor in a case that the receiving sensor receives the signal from the emitting sensor.

Optionally, the sensor includes at least two pairs of through-beam sensors. Each pair of through-beam sensors are symmetrically arranged on the left arm and the right arm. Moreover, there is a set interval between two adjacent groups of through-beam sensors. The determining a depth of a goods container according to the measurement signal includes: determining the depth of the goods container according to the set interval and measurement signals collected by the at least two pairs of through-beam sensors.

Optionally, the sensor is the visual sensor. The collecting, by a sensor of the goods picking apparatus, a measurement signal when a goods picking assembly of the goods picking apparatus extends includes: photographing, by the visual sensor, a measurement image of a working region of the goods picking assembly when the goods picking assembly of the goods picking apparatus extends. Correspondingly, the determining a depth of a goods container according to the measurement signal includes: determining the depth of the goods container according to the measurement image.

Optionally, the sensor is a distance measurement sensor. The distance measurement sensor is arranged at an inner side of the left arm or the right arm. The collecting, by a sensor of the goods picking apparatus, a measurement signal when a goods picking assembly of the goods picking apparatus extends includes: collecting, by the distance measurement sensor, a measurement distance when the goods picking assembly of the goods picking apparatus extends. Correspondingly, the determining a depth of a goods container according to the measurement signal includes: determining the depth of the goods container according to the measurement distance.

Optionally, the goods picking assembly further includes a pushing rod assembly. The pushing rod assembly is movably mounted at one end of the goods picking assembly close to the goods container. After determining the depth of the goods container according to the measurement signal, the depth measurement method further includes: controlling the pushing rod assembly to inwards rotate to a state of being perpendicular to an inner side surface of the goods picking assembly; and picking the goods container according to the depth of the goods container.

Optionally, after picking the goods container according to the depth of the goods container, the method further includes: placing, according to the depth of the goods container, the goods container on the buffer mechanism of the warehousing robot.

On the basis of depths, different pushing distances are determined for the goods containers having different depths, so that the goods containers having various depths can be placed at safe positions on the premise that the goods containers are not damaged, and thus, the safety of the goods containers during movement is improved.

Optionally, the depth measurement method further includes: determining, according to the measurement signal in a case that the goods picking apparatus is initialized, whether there is the goods container on the goods picking assembly of the goods picking apparatus; and if there is the goods container on the goods picking assembly, controlling the pushing rod assembly to inwards rotate to the state of being perpendicular to the inner side surface of the goods picking assembly.

Specifically, the initialization of the goods picking apparatus can be that the goods picking apparatus is started, or the goods picking apparatus moves.

Optionally, after determining the depth of the goods container according to the measurement signal, the method further includes: obtaining, by the depth determining module, a preset arm extension distance; obtaining, in a case that an arm extension distance of the goods picking assembly reaches the preset arm extension distance, the measurement signal outputted by the sensor; controlling, in a case that the measurement signal is the default signal, the goods picking assembly to pick the goods container according to the depth of the goods container; and generating, in a case that the measurement signal is the preset obstruction signal, preset arm extension distance error information.

Figure 12:
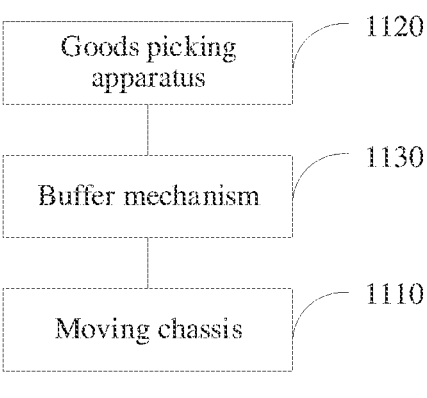
FIG. 12 is a schematic structural diagram of a warehousing robot provided by one embodiment of the present disclosure.

FIG. 12 is a schematic structural diagram of a warehousing robot provided by one embodiment of the present disclosure. As shown in FIG. 12, the warehousing robot includes a moving chassis 1110 and a goods picking apparatus 1120.

The goods picking apparatus 1120 is the goods picking apparatus provided by any one of the embodiments corresponding to FIGS. 2-10 of the present disclosure, and is connected to the moving chassis 1110 and configured to pick or place the goods container according to the depth of the goods container.

Optionally, the warehousing robot further includes: a buffer mechanism 1130, mounted on the moving chassis 1110 and configured to place the goods container; and correspondingly, the goods picking apparatus 1120, further configured to place the goods container on the buffer mechanism 1130 according to a depth of the goods container.

The buffer mechanism 1130 can specifically be in the form of a back basket.

Figure 13:
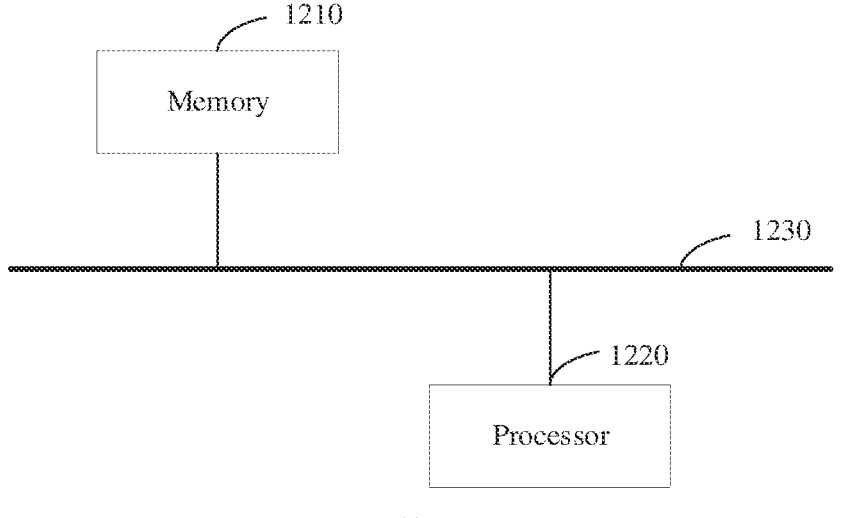
FIG. 13 is a schematic structural diagram of a warehousing robot provided by one embodiment of the present disclosure.

FIG. 13 is a schematic structural diagram of a warehousing robot provided by one embodiment of the present disclosure. As shown in FIG. 13, the warehousing robot includes a memory 1210, a processor 1220, and a computer program.

The computer program is stored in the memory 1210 and configured to be executed by the processor 1220 so as to implement the depth measurement method of the embodiment corresponding to FIG. 11 of the present disclosure.

The memory 1210 and the processor 1220 are connected through a bus 1230.

Related description can be understood with reference to the related illustration and effects corresponding to the steps in FIG. 10, and is not made here again.

Figure 14:
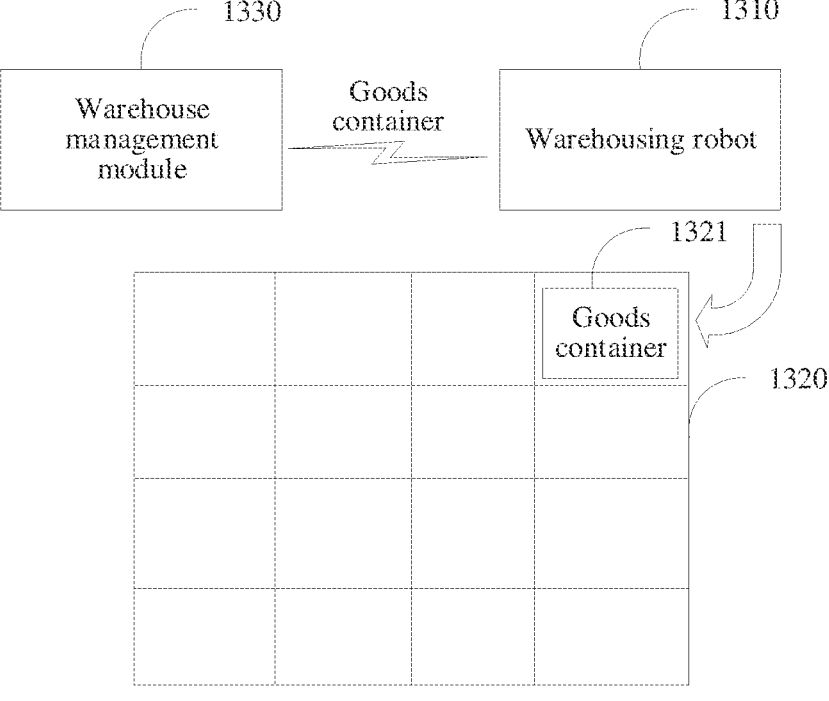
FIG. 14 is a schematic structural diagram of a warehousing system provided by one embodiment of the present disclosure.

FIG. 14 is a schematic structural diagram of a warehousing system provided by one embodiment of the present disclosure. As shown in FIG. 14, the warehousing system includes a warehousing robot 1310, a goods shelf 1320, and a warehouse management module 1330.

A goods container 1321 is placed on the goods shelf 1320 or needs to be placed on the goods shelf 1320. The warehousing robot 1310 is a warehousing robot provided by any one of the embodiments corresponding to FIG. 12 and FIG. 13 of the present disclosure. The warehousing robot 1310 is connected to the warehouse management module 1330 and configured to receive an instruction of the warehouse management module, where the instruction includes the information of the goods container that needs to be picked or stored, and the warehousing robot moves to a set position according to the instruction of the warehouse management module 1330, and picks or places the goods container.

One embodiment of the present disclosure provides a computer readable storage medium having a computer program stored thereon. When the computer program is executed by a processor, the depth measurement method provided by the embodiment corresponding to FIG. 11 of the present disclosure is implemented.

The computer readable storage medium can be a ROM, a random access memory (RAM), a CD-ROM, a magnetic tape, a floppy disk, an optical data storage device, or the like.

It is to be understood that the disclosed apparatus and method in the embodiments provided in the present disclosure may be implemented by other modes. For example, the apparatus embodiments described above are merely exemplary. For example, module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by some interfaces. The indirect couplings or communication connections between the apparatuses or modules may be electrical, mechanical, or in other forms.

A person skilled in the art can easily figure out other implementation solutions of the present disclosure after considering the specification and practicing the disclosure disclosed here. The present disclosure is intended to cover any variations, functions, or adaptive changes of the present disclosure. These variations, functions, or adaptive changes comply with general principles of the present disclosure, and include common general knowledge or common technical means in the art that are not disclosed in the present disclosure. The description and embodiments are merely considered to be exemplary, and the actual scope and spirit of the present disclosure are pointed out in the following claims.

It should be understood that the present disclosure does not limit at an accurate structure that is described above and shown in the drawings, and can be modified and changed in every way without departing from the scope thereof. The scope of the present disclosure is limited only by the attached claims.

What is claimed is:

1. A goods picking apparatus, comprising: a goods picking assembly, a sensor, and a depth determining module;

wherein the sensor is provided on the goods picking assembly, the sensor is configured to collect a measurement signal when the goods picking assembly extends, the measurement signal comprises a default signal and a preset obstruction signal, the default signal is a corresponding signal in a case that the sensor is not obstructed by a goods container, and the preset obstruction signal is a corresponding signal in a case that the sensor is obstructed by the goods container;

wherein the depth determining module is configured to determine a depth of the goods container according to the measurement signal; and wherein the goods picking assembly is configured to pick or place the goods container according to the depth of the goods container;

wherein the depth is a length of the goods container in an extension direction of the goods picking assembly;

wherein the depth determining module is configured to:

obtain a preset arm extension distance;

obtain, in a case that an arm extension distance of the goods picking assembly reaches the preset arm extension distance, the measurement signal outputted by the sensor;

control, in a case that the measurement signal is the default signal, the goods picking assembly to pick the goods container; and generate, in a case that the measurement signal is the preset obstruction signal, preset arm extension distance error information.

2. The goods picking apparatus according to claim 1, wherein the goods picking assembly comprises a left arm and a right arm, and the left arm and the right arm are symmetrically arranged; and wherein the sensor is provided on at least one of the left arm and the right arm.

3. The goods picking apparatus according to claim 2, wherein the depth determining module is specifically configured to:

obtain, in a case that the measurement signal is changed from the default signal to the preset obstruction signal, a first state of the goods picking assembly;

obtain, in a case that the measurement signal is changed from the preset obstruction signal to the default signal, a second state of the goods picking assembly; and determine the depth of the goods container according to the first state and the second state.

4. The goods picking apparatus according to claim 3, wherein the first state comprises a first extension length of the goods picking assembly, and the second state comprises a second extension length of the goods picking assembly, the depth determining module is configured to determine the depth of the goods container according to a difference value between the first extension length and the second extension length.

5. The goods picking apparatus according to claim 3, wherein the sensor comprises a pair of through-beam sensors; wherein the pair of through-beam sensors comprise an emitter and a receiving sensor; wherein the emitter and the receiving sensor are symmetrically arranged on the left arm and the right arm;

wherein the preset obstruction signal is an output signal of the receiving sensor in a case that the receiving sensor does not receive a signal from the emitter; and wherein the default signal is an output signal of the receiving sensor in a case that the receiving sensor receives the signal from the emitter.

6. The goods picking apparatus according to claim 2, wherein the sensor comprises N+1 pairs of through-beam sensors; wherein each pair of through-beam sensors are symmetrically arranged on the left arm and the right arm, and there is a set interval between two adjacent groups of through-beam sensors, wherein N is greater than or equal to 1; and wherein the depth determining module is configured to:

determine, when output signals of receiving sensors of at least two pairs of through-beam sensors are the default signals and an $M^{th}$ receiving sensor is the closest receiving sensor to a first receiving sensor among the receiving sensors of which the output signals are the default signals, (M−1)*L to be the depth of the goods container, wherein M is a positive integer less than or equal to N, L is the set interval, and the first receiving sensor is the receiving sensor located at an end of the goods picking assembly in the extension direction of the goods picking assembly.

7. The goods picking apparatus according to claim 2, wherein the sensor is a visual sensor; the visual sensor is arranged on an upper surface of the goods picking assembly;

and the measurement signal is a measurement image of a working region of the goods picking assembly photographed by the visual sensor; or wherein the sensor is a distance measurement sensor; the distance measurement sensor is arranged at an inner side of the left arm or the right arm; and the measurement signal is a measurement distance outputted by the distance measurement sensor.

8. The goods picking apparatus according to claim 1, wherein the goods picking assembly comprises a pushing rod assembly; wherein the pushing rod assembly is movably mounted at one end of the goods picking assembly in the extension direction of the goods picking assembly; and wherein after the depth determining module determines the depth of the goods container, the pushing rod assembly is configured to rotate to a state of being perpendicular to an inner side surface of the goods picking assembly.

9. A depth measurement method, executed by a goods picking apparatus of a warehousing robot, the goods picking apparatus comprising a goods picking assembly, a sensor, and a depth determining module, wherein the depth measurement method comprises:

collecting, by the sensor of the goods picking apparatus, a measurement signal when the goods picking assembly extends, wherein the measurement signal comprises one of a default signal and a preset obstruction signal, the default signal is a corresponding signal in a case that the sensor is not obstructed by a goods container, and the preset obstruction signal is a corresponding signal in a case that the sensor is obstructed by the goods container;

determining, by the depth determining module of the goods picking apparatus, a depth of the goods container according to the measurement signal; and picking or placing, by the goods picking assembly, the goods container according to the depth of the goods container;

wherein the depth is a length of the goods container in an extension direction of the goods picking assembly; and wherein the depth measurement method further comprises:

obtaining, by the depth determining module, a preset arm extension distance;

obtaining, in a case that an arm extension distance of the goods picking assembly reaches the preset arm extension distance, the measurement signal outputted by the sensor;

controlling, in a case that the measurement signal is the default signal, the goods picking assembly to pick the goods container according to the depth of the goods container; and generating, in a case that the measurement signal is the preset obstruction signal, preset arm extension distance error information.

10. The method according to claim 9, wherein the goods picking assembly comprises a left arm and a right arm, and the determining a depth of a goods container according to the measurement signal comprises:

obtaining, in a case that the measurement signal is changed from the default signal to the preset obstruction signal, a first state of the goods picking assembly;

obtaining, in a case that the measurement signal is changed from the preset obstruction signal to the default signal, a second state of the goods picking assembly; and determining the depth of the goods container according to the first state and the second state.

11. The method according to claim 10, wherein the sensor comprises a pair of through-beam sensors; wherein the pair of through-beam sensors comprise an emitter and a receiving sensor; wherein the emitter and the receiving sensor are symmetrically arranged on the left arm and the right arm; wherein the preset obstruction signal is an output signal of the receiving sensor in a case that the receiving sensor does not receive a signal from the emitter; and wherein the default signal is an output signal of the receiving sensor in a case that the receiving sensor receives the signal from the emitter.

12. The method according to claim 9, wherein the goods picking assembly comprises a left arm and a right arm; the sensor comprises at least two pairs of through-beam sensors; wherein each pair of through-beam sensors are symmetrically arranged on the left arm and the right arm, and there is a set interval between two adjacent groups of through-beam sensors; and wherein the determining the depth of the goods container according to the measurement signal comprises determining the depth of the goods container according to the set interval and measurement signals collected by the at least two pairs of through-beam sensors.

13. The method according to claim 9, wherein the sensor is a visual sensor; wherein the visual sensor is arranged on an upper surface of the goods picking assembly;

wherein the collecting, by the sensor of the goods picking apparatus, the measurement signal when the goods picking assembly of the goods picking apparatus extends comprises photographing, by the visual sensor, a measurement image of a working region of the goods picking assembly when the goods picking assembly extends; and wherein the determining the depth of the goods container according to the measurement signal comprises determining the depth of the goods container according to the measurement image.

14. The method according to claim 9, wherein the goods picking assembly comprises a left arm and a right arm;

wherein the sensor is a distance measurement sensor; the distance measurement sensor is arranged at an inner side of the left arm or the right arm;

wherein the collecting, by the sensor of the goods picking apparatus, the measurement signal when the goods picking assembly of the goods picking apparatus extends comprises collecting, by the distance measurement sensor, a measurement distance when the goods picking assembly extends; and wherein the determining the depth of the goods container according to the measurement signal comprises determining the depth of the goods container according to the measurement distance.

15. The method according to claim 9, wherein the goods picking assembly comprises a pushing rod assembly;

wherein the pushing rod assembly is movably mounted at one end of the goods picking assembly in the extension direction of the goods picking assembly; and wherein after determining the depth of the goods container according to the measurement signal, the method further comprises controlling the pushing rod assembly to rotate inwards to a state of being perpendicular to an inner side surface of the goods picking assembly.

16. The method according to claim 15, further comprising:

determining, according to the measurement signal in a case that the goods picking apparatus is initialized, whether there is the goods container on the goods picking assembly; and wherein the controlling the pushing rod assembly to rotate inwards to the state of being perpendicular to the inner side surface of the goods picking assembly comprises:

determining that there is the goods container on the goods picking assembly; and based on a determination that there is the goods container on the goods picking assembly, controlling the pushing rod assembly to rotate inwards to the state of being perpendicular to the inner side surface of the goods picking assembly.

17. The method according to claim 9, wherein after picking the goods container according to the depth of the goods container, the method further comprises:

placing, according to the depth of the goods container, the goods container on a buffer mechanism of the warehousing robot.

18. A warehousing robot, comprising a moving chassis and a goods picking apparatus connected to the moving chassis;

wherein the goods picking apparatus comprises a goods picking assembly, a sensor, and a depth determining module;

wherein the sensor is provided on the goods picking assembly, the sensor is configured to collect a measurement signal when the goods picking assembly extends, the measurement signal comprises a default signal and a preset obstruction signal, the default signal is a corresponding signal in a case that the sensor is not obstructed by a goods container, and the preset obstruction signal is a corresponding signal in a case that the sensor is obstructed by the goods container;

wherein the depth determining module is configured to determine a depth of the goods container according to the measurement signal;

wherein the goods picking assembly is configured to pick or place the goods container according to the depth of the goods container;

wherein the depth is a length of the goods container in an extension direction of the goods picking assembly; and wherein the depth determining module is further configured to:

obtain a preset arm extension distance;

obtain, in a case that an arm extension distance of the goods picking assembly reaches the preset arm extension distance, the measurement signal outputted by the sensor;

control, in a case that the measurement signal is the default signal, the goods picking assembly to pick the goods container; and generate, in a case that the measurement signal is the preset obstruction signal, preset arm extension distance error information.

19. The warehousing robot according to claim 18, further comprising a buffer mechanism, mounted on the moving chassis and configured to place the goods container, wherein the goods picking apparatus is configured to place the goods container on the buffer mechanism according to the depth of the goods container.

20. A warehousing system, comprising a warehousing robot, a goods shelf, and a warehouse management module, wherein the warehousing robot is connected to the warehouse management module and comprises a moving chassis and a goods picking apparatus connected to the moving chassis;

wherein the goods picking apparatus comprises a goods picking assembly, a sensor, and a depth determining module;

wherein the sensor is provided on the goods picking assembly, the sensor is configured to collect a measurement signal when the goods picking assembly extends;

wherein the measurement signal comprises a default signal and a preset obstruction signal, the default signal is a corresponding signal in a case that the sensor is not obstructed by a goods container, and the preset obstruction signal is a corresponding signal in a case that the sensor is obstructed by the goods container;

wherein the depth determining module is configured to determine a depth of the goods container according to the measurement signal;

wherein the depth is a length of the goods container in an extension direction of the goods picking assembly;

wherein the moving chassis is configured to move, according to an instruction of the warehouse management module, to a position where the goods container is located, and the goods picking assembly is configured to pick the goods container according to the depth of the goods container, wherein the goods container is placed on the goods shelf; or the moving chassis is configured to move, according to an instruction of the warehouse management module, to a position where the goods container is to be placed, and the goods picking assembly is configured to place the goods container to the position according to the depth of the goods container;

wherein the depth determining module is configured to:

obtain a preset arm extension distance;

obtain, in a case that an arm extension distance of the goods picking assembly reaches the preset arm extension distance, the measurement signal outputted by the sensor;

control, in a case that the measurement signal is the default signal, the goods picking assembly to pick the goods container; and generate, in a case that the measurement signal is the preset obstruction signal, preset arm extension distance error information.

21. A computer readable storage medium, storing computer executable instructions, wherein the computer executable instructions, when executed by a processor, are configured to:

control a sensor of a goods picking apparatus to collect a measurement signal when a goods picking assembly of the goods picking apparatus extends, wherein the measurement signal comprises one of a default signal and a preset obstruction signal, the default signal is a corresponding signal in a case that the sensor is not obstructed by a goods container, and the preset obstruction signal is a corresponding signal in a case that the sensor is obstructed by the goods container;

control a depth determining module of the goods picking apparatus to determine a depth of the goods container according to the measurement signal; and control the goods picking assembly to pick or place the goods container according to the depth of the goods container;

wherein the depth is a length of the goods container in an extension direction of the goods picking assembly;

wherein the computer executable instructions, when executed by the processor, are further configured to control the depth determining module to:

obtain a preset arm extension distance;

obtain, in a case that an arm extension distance of the goods picking assembly reaches the preset arm extension distance, the measurement signal outputted by the sensor;

control, in a case that the measurement signal is the default signal, the goods picking assembly to pick the goods container; and generate, in a case that the measurement signal is the preset obstruction signal, preset arm extension distance error information.

* * * * *